Dec. 14, 1965

E. F. D. WEBB 3,223,862

ELECTRIC SERVO MOTORS

Filed May 9, 1961

4 Sheets-Sheet 1

INVENTOR
EDWARD FRANCIS DANIEL WEBB

By Dean Fairbank & Hirsch

ATTORNEYS

Dec. 14, 1965  E. F. D. WEBB  3,223,862
ELECTRIC SERVO MOTORS
Filed May 9, 1961  4 Sheets-Sheet 2

INVENTOR
EDWARD FRANCIS DANIEL WEBB

By Dean, Fairbank & Hirsch

ATTORNEYS

United States Patent Office 3,223,862
Patented Dec. 14, 1965

3,223,862
ELECTRIC SERVO MOTORS
Edward Francis Daniel Webb, 367 Finchampstead Road,
Wokingham, England
Filed May 9, 1961, Ser. No. 108,829
Claims priority, application Great Britain, May 16, 1960,
17,292/60
11 Claims. (Cl. 310—68)

This invention relates to electric motors, and is more particularly concerned with electric servo motors.

It is an object of the present invention to provide a reversible electric motor which has a high sensitivity to changes in the controlling signal and which is capable of controlling heavy loads. Such motors are intended to be used particularly in process control wherein it is often required to manipulate valves, dampers, rheostats, induction regulators and such like control means for the purposes of providing modulations in the flow of liquids, solids (granular or pulverised) in accordance with the dictates of an automatic control unit or system. In such applications it is essential that the operation of the control element is such that the adjustments of the element are accurate and are maintained within very closely predetermined limits.

Many process control systems require pneumatic or hydraulic arrangements in order to convert electrical signals produced by said automatic control system into pneumatic or hydraulic signals which are arranged to actuate said valves, dampers, rheostats, induction regulators and the like. It is a further object of the invention to provide an electric motor construction which eliminates the need for such pneumatic or hydraulic arrangements.

In accordance with a first aspect of the present invention there is provided a motor including a stator unit comprising two polyphase induction motor stator windings axially spaced with respect to each other and connected to generate oppositely rotating fields, and a rotor carrying two polyphase windings arranged on a common shaft so that each cooperates with one of the stator windings, wherein the phase windings of each rotor winding are star connected at one end and the remaining end of each of the phase windings of each rotor winding is connected to a full wave bridge rectifier network, the connections being such that one phase winding from each of the two rotor polyphase windings is connected to opposite terminals of the same rectifier network, and wherein the outputs of all the rectifier networks are commoned across a resistive or reactive load.

Figure 1:
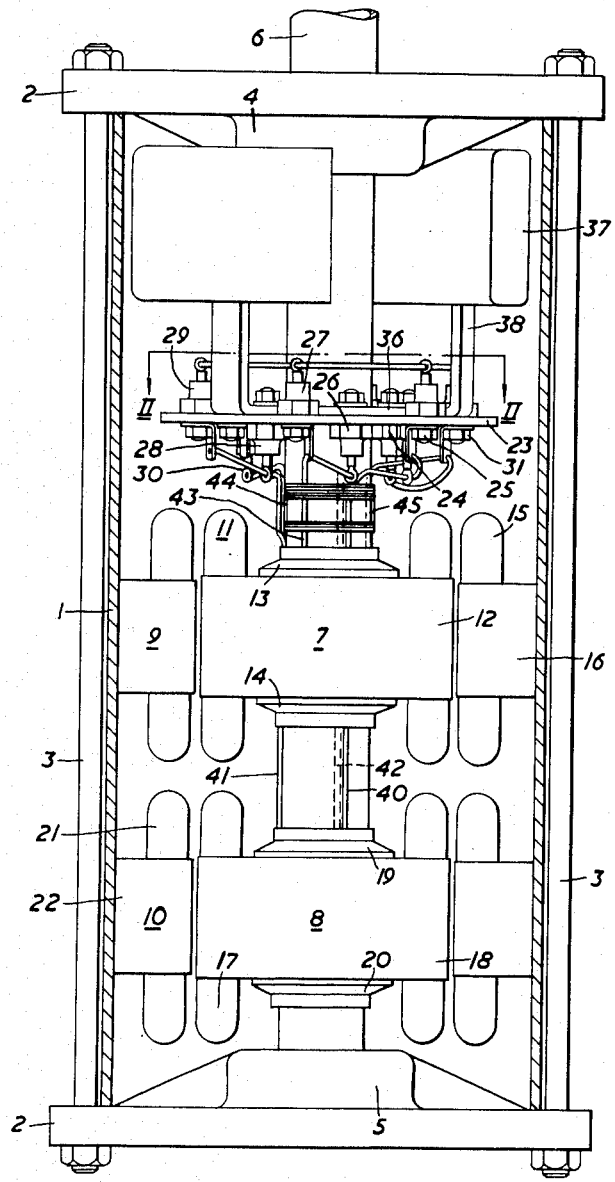
Figure 2:
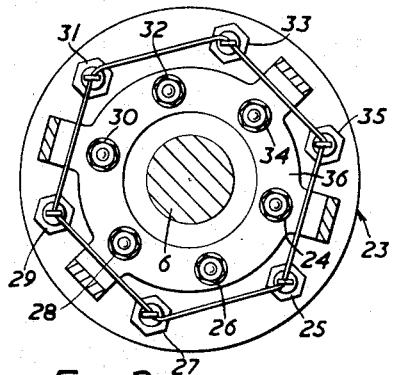
Figure 4:
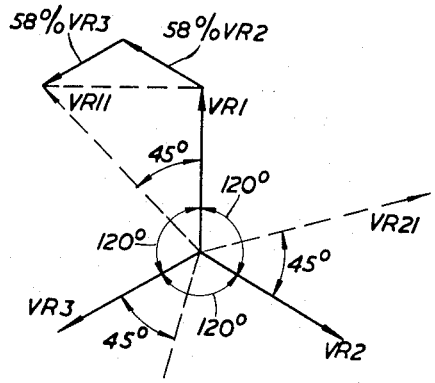
Figure 7:
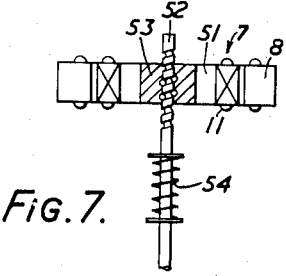
Figure 3:
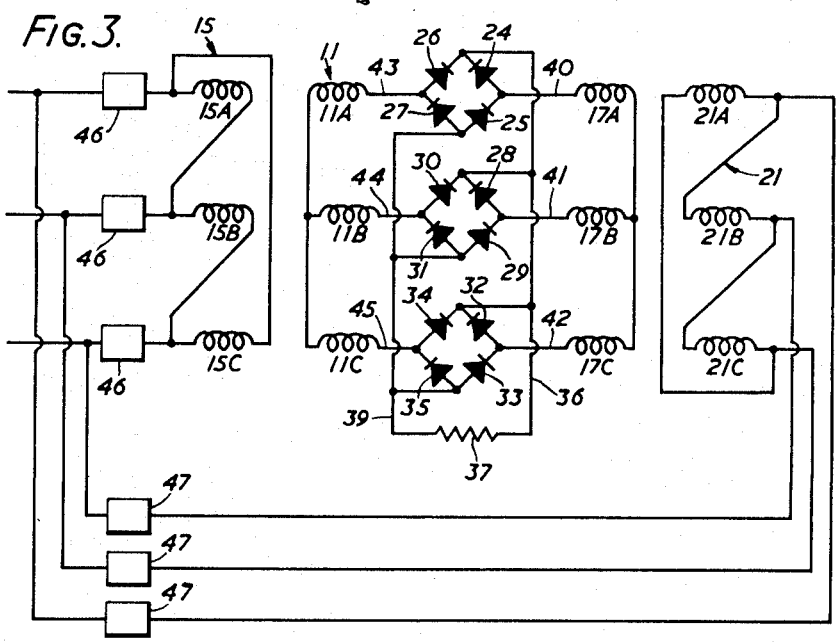
Figure 5:
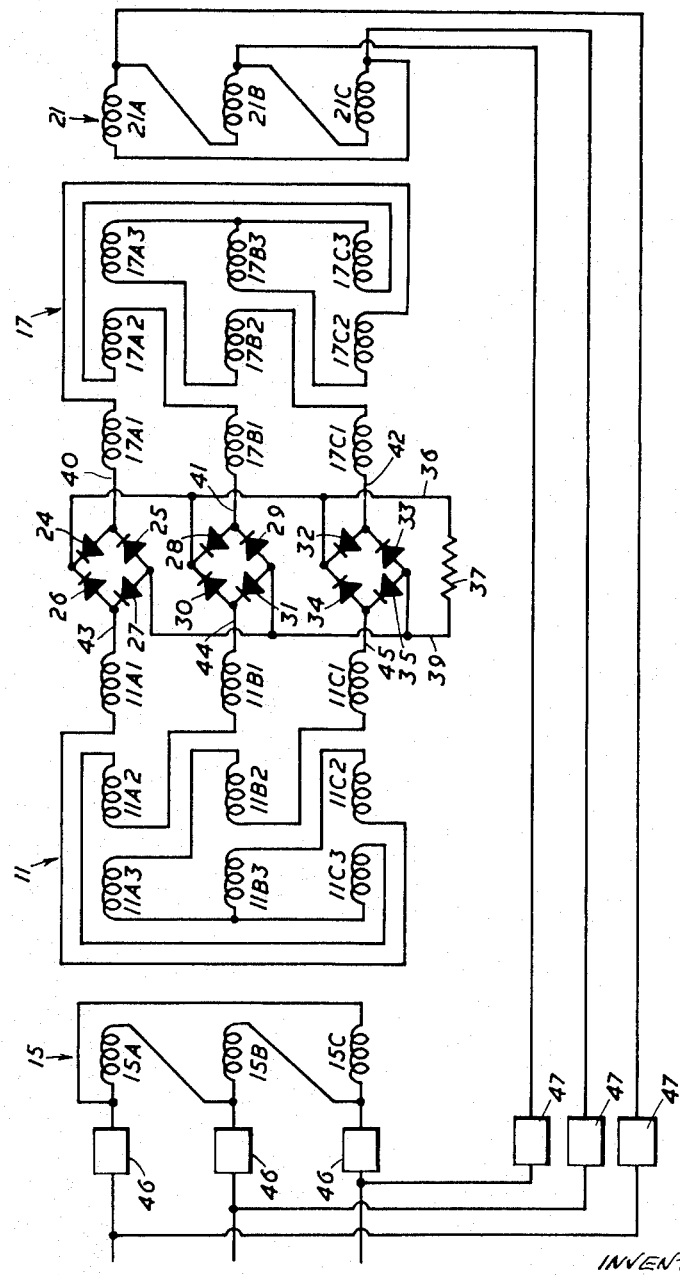
Figure 6:
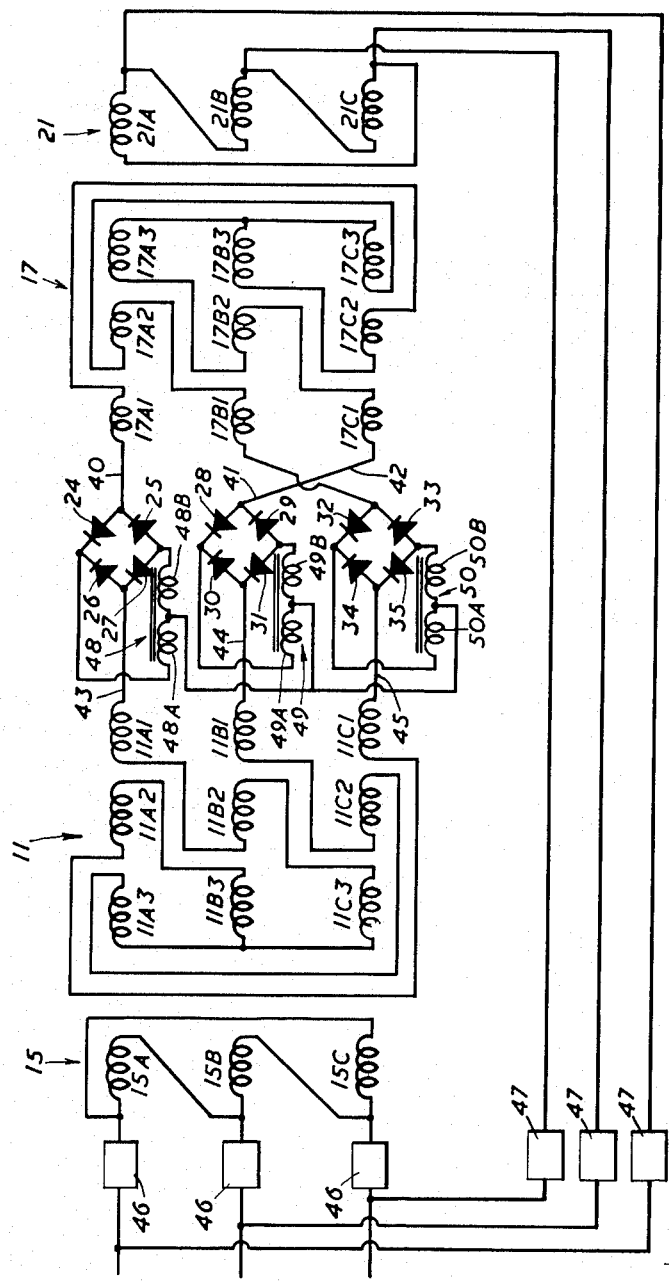

For a better understanding of the invention reference will be made to the accompanying drawings in which FIGURE 1 schematically illustrates a particular embodiment of electric motor, FIGURE 2 is a part section on the line II—II of FIGURE 1, FIGURE 3 is a first embodiment of a circuit diagram of the motor of FIGURES 1 and 2, FIGURE 4 is a vector diagram illustrating the voltage relationships in the rotor of a polyphase induction motor, FIGURE 5 is a schematic circuit diagram of a modified form of the electrical wiring associated with the motor of FIGURES 1 and 2, FIGURE 6 illustrates a further modified wiring diagram of the motor in accordance with the invention, FIGURE 7 illustrates schematically an arrangement for converting motor rotation into axial movement of a shaft.

Referring now particularly to FIGURES 1 and 2 the motor includes a hollow casing 1 which is of cylindrical form and which is provided with end plates 2, held in place by bolts 3 of which only two are shown. The end plates 2 are adapted so as to provide bearings 4 and 5 for a rotor shaft 6, one end of the shaft 6 extending outwardly of one of the end plates 2 so as to provide the output shaft of the motor. The bearings 4 and 5 for the shaft 6 can be ball or roller journal bearings and conveniently the bearing 5 can be of the thrust type. The shaft 6 carries two axially separated rotors 7 and 8 which are arranged to cooperate with stators 9 and 10 which are fixedly secured to the casing 1.

The rotor 7 includes a set of three phase A.C. motor rotor windings 11 which are wound on a laminated core 12, the core 12 being held on the shaft 6 with the aid of clamp rings 13 and 14. The stator 9 includes a set of three phase A.C. motor stator windings 15 which are wound on a laminated stator core 16 secured to the internal wall of the casing 1.

The rotor 8 includes a set of three phase A.C. motor windings 17 which are wound on a laminated core 18 which is securely attached to the shaft 6. The laminations of the core 18 are held in place by clamp rings 19 and 20. The stator 10 includes a set of three phase A.C. motor stator windings 21 which are wound on a laminated core 22 secured to the internal wall of the casing 1.

An annular plate 23 is securely attached to and rotatable with the shaft 6. The plate 23 serves as a support for a rectifier assembly including 12 rectifiers which are arranged in two rings of six rectifiers each. The rectifiers being identified by the reference numerals 24 to 35.

The positive poles or connections of the rectifiers 24, 26, 28, 30, 32 and 34 are connected together by a conductor ring 36 which has an arm 36A connected to one end of a resistance element 37. The resistance element 37 is of annular form and is securely mounted via arms 39 of the conductor ring 36 on to the plate 23. The negative poles or connections of the rectifiers 25, 27, 29, 31, 33 and 35 are connected together by a conductor 39 and to the opposite end of the resistance element 37.

One end of each of the three phase rotor windings 17 are connected together to form a star point connection for the complete rotor winding assembly. The opposite ends of these rotor windings are connected via insulated conductors 40, 41 and 42 to the rectifiers 24 and 25; 28 and 29, 32 and 33 respectively. Similarly one end of each of the three phase rotor windings 11 of the rotor 7 are connected together to form a further star point for the complete rotor winding assembly of the rotor 7 and the opposite ends of these rotor windings are connected by insulated conductors 43, 44 and 45 to the rectifiers 26 and 27, 30 and 31, and 34 and 35.

FIGURE 3 illustrates in schematic form the circuit diagram associated with the motor embodiment shown in FIGURES 1 and 2. For convenience of reference those parts of the circuit of FIGURE 3 which are the same as those which have been described in relation to FIGURES 1 and 2 will receive the same reference numerals. In addition the phases of the three phase windings will be identified by the suffixes A, B and C, thus for example the rotor windings 11 and 17 have phase windings 11A, 11B and 11C and 17A, 17B and 17C respectively. Similarly the stator windings have phase windings 15A, 15B, and 15C and 21A, 21B and 21C respectively.

The stator windings 15 and 21 are energised from a polyphase A.C. supply via voltage control means 46 and 47 the stator windings 15 and 21 being energised in parallel from a common course. It will be noted that the rotor assembly does not involve any brush gear, slip rings or the like.

The motor as so far described operates in the following manner. When the voltage supplied from the polyphase A.C. supply to the stator windings 15 and 21 are equal such equality being obtained by suitable adjustment of the voltage control means 46 and 47. In the use of the rotor in a process control system the voltage control means 46 and 47 will be actuated in response to the electrical control signals produced in the control system. The voltages induced in the rotor windings 11 and 17 will be equal. Under these conditions equal currents will then flow through the rotor windings 11 and 17 and after rectification in the rectifier network includuing the rectifiers 24 to 35 these currents will flow through the resistance 37. The direct current flow through the resistance 37 in the embodiment shown in FIGURE 3 is approximately three times the root means square alternating current flowing in the rotor windings 11 and 17. Furthermore, the voltage across the resistance 37 opposes the voltage induced in the rotor windings 11 and 17 thereby limiting the current through the resistance. In view of this limitation of the current, the torque developed in both rotors is equal and opposite whereby the rotor shaft 6 is caused to remain stationary.

If a voltage difference is produced between the voltages applied to the stator windings 15 and 21 a corresponding voltage differential is produced across the rotor windings 11 and 17. In general such a voltage differential between the stator windings 15 and 21 can be produced by increasing the voltage applied to the one stator winding 15 (or 22) and decreasing the voltage applied to the other stator winding 21 (or 15). Alternatively the voltage of the stator winding 15 (or 21) can be increased to a greater extent than an increase applied to the other rotor winding 21 (or 15). Finally both of the voltages applied to the stator windings 15 and 21 can be decreased from the value to which they had been previously set so as to produce the stationary condition, the decrease in one winding being greater than that in the other stator winding. For example if the voltage applied to the stator winding 15 is increased and that applied to the stator winding 21 is decreased the voltage induced in the rotor windings 11 and 17 will be unequal. In effect the voltage induced in the rotor winding 11 will be greater than that induced in the rotor winding 17, thereby increasing the current in the rotor windings 11 and decreasing the current in the rotor winding 17.

The torque developed by each rotor 7 and 8 is a function of the rotor current interacting with the rotating magnetic flux induced in the associated rotor core 9 and 10 respectively and the phase angle between the rotor current and the magnetic flux. Since the current and the flux are both increased in the case of the rotor with the higher voltage and are both decreased in the case of the rotor having the lower voltage a considerable difference of torque is developed between the rotors 7 and 8. This difference in torque produces a rotation of the rotor shaft 6 in a direction appropriate to the stator and rotor having the higher voltage.

If the difference between the e.m.f.'s induced in the rotors 7 and 8 is equal to or greater than the voltage drop within the rotor winding 11 or 17 carrying the higher voltage, the rectifiers of the group of rectifiers 24 to 35 which are associated with the other rotor winding 17 or 11 effectively block all current flow through the other rotor winding 17 or 11 so that no torque is produced in the lower voltage rotor 17 or 11. The torque produced by the higher voltage rotor 11 or 17 is therefore unopposed and is wholly available to provide the required drive.

Thus if the rotor 7 is at a higher voltage than the rotor 8 it is the rectifiers 24, 25, 28, 29, 32 and 33 which effect the blocking of the current flow with respect to the rotor 8.

When the rotation of the rotor shaft 6 occurs, the higher voltage rotor 7 in the illustrated case, can be regarded as the "driving" rotor and in so doing the slip frequently is reduced and the induced voltage also reduced. The lower voltage rotor (the rotor 8) becomes "driven" rotor and is driven in contrarotation to the rotating magnetic field thereby increasing the slip frequency and thus increasing the induced voltage. The motor rotor shaft 6 thereby rotates at a speed at which the induced voltage in the driving rotor windings 11 less the voltage drop in the windings due to current flow through the windings is equal to the voltage induced in the driven rotor windings 17.

In other words it will be understood that with the above described arrangement the rotor windings of the "driven" rotor are effectively open-circuited by the rectifier arrangements.

Since the above described motor is required to be used for the purpose of moving valves and the like in control systems it is preferable that the motor should be capable of developing a maximum torque at standstill so that as soon as a control signal produces a voltage differential across the stator windings 15 and 21 the motor shaft will turn the controlled element substantially instantaneously with the production of the voltage differential across the rotor windings 11 and 17 which causes the rotor shaft 6 to rotate.

In order to develop this desirable feature maximum torque at the standstill in an A.C. induction motor it is necessary to add resistance in series with the rotor windings of the motor, with a view to improving the phase relationship between the rotor current and the flux of the rotating magentic field which is induced in the rotor cores by the polyphase alternating voltages applied to the stator winding of the motor.

The maximum torque is developed at standstill when the total resistance in the rotor circuit is equal to the reactance in the rotor circuit at the frequency of the alternating supply. Under these conditions the rotor current will lag behind the voltage inducted in the rotor by 45°. The inclusion of the resistance in order to produce the desired phase lag unfortunately increases the power lost in the motor, this power loss being exhibited in the form of heat, in the rotor circuit thereby reducing the overall efficiency of the motor.

In a further modified form of the electrical circuitry of the motor in accordance with the invention the desirable high torque at standstill is obtained without the inclusion of an unduly great amount of resistance in the rotor circuit by advancing the phase of the voltage applied to each rotor winding 11A, 11B, 11C and 17A, 17B and 17C by approximately 45° in advance of the voltage induced in the phase windings 15A, 15B, 15C and 21A, 21B and 21C of the stator windings 15 and 21 respectively. This advance of the phase by 45° is achieved by adding to the induced voltage of each phase winding of the rotor a proportion of the voltages induced in the other phase windings of the same rotor winding 11 or 17.

This problem of advancing the phase of each rotor winding by substantially 45° in front of the voltage induced in the winding, will be considered in relation to FIGURE 4 which is a vectorial representation of the voltages VR1, VR2, and VR3 of phases 1, 2, and 3 respectively induced in the rotor of a three phase induction motor having rotor windings R1, R2 and R3. It will be seen from the vector diagram that by the addition to phase 1 of approximately 58% that is to say 1/2 cos 30 of the voltage induced in the phase 2 with reversed polarity with respect to phase 2 and approximately 58% of the voltage induced in phase 3 with the same polarity as phase 3. The resultant vector VR11 represents the voltage applied to the phase 1 so that rotor winding is advanced by 45° ahead of the vector VR1. The vectors VR21 and VR31 represent the voltages applied to phases 2 and 3 when similar percentages of the voltage factors of the other phases of the rotor winding have been added thereto.

A convenient method of effecting this addition of the 58% of the phases in the other windings to any one winding can be effected by dividing each of the phase windings into three parts. This is shown in FIGURE 5 of the drawings.

It will be seen from FIGURE 5 that each phase winding 11A, 11B, 11C, 17A, 17B, 17C of the rotor windings 11 and 17 respectively are divided into three separate parts. For convenience of reference the parts are identified as follows:

Rotor phase winding 11A is divided into the parts 11A1, 11A2 and 11A3; phase winding 11B is divided into parts 11B1, 11B2 and 11B3; phase winding 11C is divided into parts 11C1, 11C2 and 11C3; phase winding 17A is divided into parts 17A1, 17A2 and 17A3; phase winding 17B is divided into parts 17B1, 17B2 and 17B3; and phase winding 17C is divided into three parts 17C1, 17C2 and 17C3. In each case the division of each phase winding is such that one part constitutes the major part of the winding and the other two parts each have approximately 58% of the turns of the major part.

The major part of each rotor winding phase is connected in series with a minor part of each one of the other two phases of the rotor winding. The series connections are such that one of the minor windings is arranged to be of the opposite sense to that of the two windings with which it is series connected. The choice of which winding is reversed in practice, determines the direction in which the rotor develops the maximum torque at standstill.

In the particular arrangement in FIGURE 5 it will be seen that the series connections between the phase winding parts are as follows: In the case of rotor winding 11 11A1, 11C2 and 11B3; 11B1, 11A2 and 11C3; 11C1, 11B2 and 11A3. In the case of the rotor winding 17 the series connections are as follows: 17A1, 17C2 and 17B3; 17B1, 17A2 and 17C3; 17C1, 17B2 and 17A3. It will be appreciated that the phase of the current which flows in each rotor winding 11 or 17 is largely dependent upon the phase of the voltage applied to that particular winding. From which it follows that the phase of the current flow in each rotor winding will also be advanced by 45° in sympathy with the voltages and will lie in approximately the same phase relationship to the rotating magnetic flux induced by the stator windings 15 and 21 into the rotor windings 11 and 17 respectively as is obtained when the total resistance in the rotor circuit is made equal to the reactance thereby to attain the conditions for maximum torque at standstill. In other words a desirable high standstill torque can be developed without the addition of an excessive amount of pure resistance into the rotor circuit of the motor. Consequently the resistive power loss in the rotor circuit is substantially reduced. As each of the two rotors 7 and 8 now develop their maximum torque in one direction only, it will be understood that the rotor voltage must be compounded with opposite phase sequence in each of the two rotors in order that each rotor shall develop maximum torque in a direction appropriate to the rotation of that rotor. That is to say in the embodiment shown in FIGURE 5 the motor must always be connected to the polyphase supply with the correct phase sequence to ensure that each rotor develops maximum torque in a direction appropriate to that rotor. This is of course a distinction between the embodiment shown in FIGURE 3 which is of course readily reversible in rotor rotation direction.

In order to improve the efficiency of the motor which has been illustrated in relation to FIGURES 1 to 5 it is proposed further to modify the circuitry of the motor so as to reduce still further the resistance included in the rotor circuit. It will be appreciated that such further reduction of the resistance in the rotor circuit will tend to reduce the power loss in the form of heat introduced into the rotor circuit. As will be seen from FIGURE 6 the resistance 37 is replaced by chokes or inductances 48, 49 and 50.

The chokes or inductances 48, 49 and 50 cannot be connected into the rotor circuit in direct replacement for the resistance 37 since the current at that part of the rotor circuit is in D.C. form and inductances would be electrically ineffective. In these circumstances the chokes or inductances 48, 49 and 50 are connected across the pairs D.C. terminal of each rectifier network associated with the windings 11A, 17A, 11B, 17B, 11C and 17C respectively. Each choke or inductance includes a split winding the halves of which are wound in the same sense with respect to each other, the windings being wound on a common soft iron core. For convenience of reference the windings halves will be identified as 48A, 48B for the inductance 48; 49A, 49B for the inductance 49; and 50A and 50B for the inductance 50. Each pair of windings 48A, 48B; 49A, 49B or 50A, 50B are connected together and also to the same point of all of the other inductances associated with the other rectifier networks. Since the directions of winding of each pair of windings 48A, 48B, 49A, 49B, 50A and 50B are in the same sense it will be appreciated that an alternating magnetic flux will be introduced into the associated core from alternate half-wave current pulses from the positive and negative poles of the associated rectifier network. In this manner in each half cycle the flow of alternating current from each rectifier network will be opposed by the back E.M.F. generated in the inductance whereby the power loss due to the resistance in the rotor circuit into which the inductance is connected will be confined to the resistance loss of the inductance windings and the rotor windings. In view of the use of the chokes or inductances 48, 49 and 50 it is necessary to have the inputs to the rectifiers in phase. In the circumstances one set of rotor winding connections are crossed over. In the FIGURE 6 the connections 41 and 42 are crossed over to correspond with the crossover of the stator windings.

The inductances are conveniently mounted rigidly onto the rotor assembly so that they rotate with the rotor. Conveniently these inductances can be mounted on a plate similar to the plate 23 which was used to carry the rectifiers.

If desired, the rectifiers and/or the inductances can be positioned intermediate of the rotor assemblies 7 and 8 instead of being located at one end of the rotor shaft 6.

As a further alternative to the resistance 37 it is possible to provide an additional fullwave rectifier network which is connected between the star points of the rotor windings 11 and 17. It will be found necessary to provide a resistance in the connection between each star point and the associated output point of the terminal. In this latter case there will be one rectifier network per phase and one further network in the star point, all rectifiers being mounted securely on the rotor assembly i.e. on the plate 23.

The motor described would normally produce rotary motion but could be made to provide linear motion by incorporating an "Acme" or similar threaded nut within the rotor assembly, and inserting into this a shaft screwed to suit the nut and prevented from rotation by means of a peg or key moving along a slot inside the casing.

The above described motor is particularly suitable for use in the actuation of valves which are utilised in an automatic process control system. In such systems it has been found necessary to provide means, such as a valve or damper arrangement in a pipe or duct carrying the variable fluid, for manipulating the controlled variable quantity.

Such control is normally carried out by using a diaphragm motor or means comprising a slack diaphragm contained in a chamber which diaphragm is caused to move against a compression spring by means of pneumatic pressure. The amount of movement of the diaphragm being determined by the applied pressure and the rate of compression of the spring. The diaphragm is connected by a rod to a spindle or lever coupled to the valve so that the valve is opened by an amount which is determined by the air pressure applied to the diaphragm.

When it is desired to operate a control system by electricity direct from a supply mains it has hitherto been necessary to use additional equipment to convert an electrical signal into pneumatic pressure prior to the signal being fed to a pneumatic valve actuator.

It is an object of the present invention to provide means whereby an actuator can be operated direct from an electricity supply mains.

Broadly, in accordance with an aspect of the present invention a motor is provided with a recirculation ball nut within the hub of the bearings for the rotor, there being a shaft having a helical track to suit the balls of the ball nut, and wherein means are provided to prevent the shaft from rotating relative to the hub whereby rotation of the rotor hub relative to the shaft will cause the shaft to move axially relative to the rotors.

FIGURE 7 of the accompanying drawings schematically illustrates an embodiment of the arrangement for converting rotor 15, rotations into axial movement of a shaft. In FIGURE 7 only one of the rotors and stators of the motor shown in FIGURES 1 to 6 is illustrated. The rotor shaft is connected with a bearing hub (not shown) in which is located a recirculating ball nut arrangement. In FIGURE 7, which is a schematic drawing, the rotor 7 has been shown as being mounted for rotation on a bearing hub 51 in which a shaft 52 is axially engaged. The shaft 52 engages a ball nut 53 provided within the hub 51 of the rotor 7. The shaft 52 is constrained from rotation so that rotation of the rotor 7 will cause the shaft 52 axially to move relative thereto. Spring means 54 are provided for opposing the movement of the shaft 52 in one direction relative to the rotor 7. The rotor 7 is arranged to develop maximum torque when at rest. The torque developed is proportional to the square of the voltage applied to the stator windings and when the applied voltage is just sufficient to produce a torque equal to the torque produced by the spring reaction through the recirculated ball nut and shaft, the rotor is held stationary. Any increase in voltage above this value causes rotation of the rotor thereby moving the shaft 52 axially against the spring 54 until equilibrium is restored, any reduction of voltage in the opposite sense causes the rotors to be rotated in the opposite direction by the reaction of the spring through the shaft and recirculating ball nut. In the event that the drive to the shaft against the spring fails, the spring 54 will automatically return the shaft 57 to its initial retracted position.

It will therefore be seen that the shaft 52 can be moved against the spring 54 by any desired amount by varying the voltage applied to the stator windings. Conveniently, the spring 54 has a constant thrust and is of such resiliency that the torque required from the motor to overcome its resiliency is kept to a minimum.

The voltage applied to the stator winding can be varied in a number of ways such as by using a saturable reactor, an induction regulator, gas filled relays, grid controlled rectifiers, silicon or germanium controlled rectifiers. The regulator can be embodied in a servo system in which a command signal (voltage or current) from an electric control system is compared with a positional feed back signal of the same type from the actuator output shaft, to provide positioning of the actuator anywhere within its travel to suit the requirements of the control system.

A potentiometer, or differential transformer (not shown) can be couplied to the output shaft of the actuator to feed back a voltage, preferably a direct current voltage, proportional to the position of the actuator shaft 51 within its travel, which could be compared with a command signal from the electrical control system by means of a magnetic amplifier, and provide an error signal which may be fed through a phase sensitive circuit to vary the operating point of the controlled rectifier.

The use of the motor illustrated in FIGURES 1 to 6 enables the shaft to travel in either direction, that is an actuator comparable to a double acting pneumatic or hydraulic cylinder.

In this case the recirculating ball nut or an Acme nut through which a threaded shaft is passed is common to both rotors.

As described in relation particularly to FIGURES 1 to 3, both stator windings are connected to the same supply source through means for controlling the voltage applied to them, the phase rotation to one stator being opposite to that to the other stator. When equal voltages are applied to each stator the torque developed in the rotors is equal and opposite so that no rotation occurs, but when the voltage to one stator is increased above that applied to the other, the rotor rotates at a speed appropriate to the difference in torque developed in the rotors. When rotor rotation occurs the threaded shaft 51 passing through the rotors 7 and 8 is moved in a direction determined by the direction of rotation of the rotors.

If it is desired that either type of actuator shall be self-sustaining in position in the event of supply failure, an electromagnetic brake (not shown) can be embodied in the mechanism.

What we claim is:

1. A motor comprising two stator units wound for polyphase alternating current operation and connected to generate oppositely rotating fields through means for controlling the relative magnitude of the voltages applied to said stators, two wound rotor units rotatable together and arranged to cooperate one with each of said stator units, and a rectifier bridge interconnecting said two rotor windings, whereby the highest E.M.F. from any phase winding of one rotor is always opposed to the highest E.M.F. generated in any phase winding of the second rotor.

2. A motor including a stator unit comprising two polyphase induction motor windings axially spaced with respect to each other and connected to generate oppositely rotating fields through means for controlling the relative magnitudes of the voltages applied to the said stators, and a rotor carrying two polyphase windings arranged on a common shaft so that each co-operates with one of the stator windings, one end of each phase winding of each rotor winding being star connected and the remaining ends of the phase windings of each rotor winding being connected to a fullwave bridge rectifier network, the connections being such that one phase winding of each of the two polyphase rotor windings is connected to opposite terminals of the same rectifier network, and wherein the outputs of all the rectifier networks are connected across a load.

3. A motor including a rotor assembly including two axially spaced apart polyphase rotor windings and a polyphase stator winding for each rotor winding, wherein one end of each phase winding of each rotor winding is star connected, whilst the remaining ends of the phase windings are connected to a rectifier arrangement including a fullwave rectifier network for each phase, and wherein the outputs of all the rectifier networks are commoned across a load.

4. A motor as claimed in claim 2, wherein each phase winding of each rotor is divided into three parts, which parts are so connected in series that each part of each phase winding is series connected with one of the parts of the phase winding of each of the other two phases, and wherein the relative proportions of said parts and the sense of the windings in the three series connections being such that maximum torque is developed in the rotor at standstill conditions.

5. A motor as claimed in claim 2, wherein each phase winding of each rotor is divided into three parts, a major part and two similar minor parts, and wherein for each phase one of said parts constitutes a major part of the phase winding and each of the other two parts comprises substantially 58% of the turns of the major part, said parts being so connected in series that the major part of one phase is connected in series with one minor part of the adjacent second phase following in rotation, and this in turn is connected in series with one minor part of the third phase also following in series, the series connections being further such that one of the minor parts is arranged to be of the opposite sense to that of the other two parts with which it is connected.

6. A motor as claimed in claim 2, wherein the said load is a resistance connected across the star points.

7. A motor as claimed in claim 2, wherein the load is constituted by an arrangement of inductances connected across the positive and negative terminals of the rectifier networks.

8. A motor as claimed in claim 7, wherein each inductance includes a split winding whose two portions are wound in the same sense on a common core, one portion being connected to the positive pole of the associated rectifier network and the other portion being connected to the negative pole of the associated network, and wherein the junction points of each split winding of each choke or inductance associated with each phase are connected together.

9. A motor as claimed in claim 2 including a recirculating ball nut within the hub of the bearings for the rotor there being a shaft having a helical track to suit the balls of the ball nut, and wherein means are provided to prevent the shaft from rotating relative to the hub whereby the rotation of the rotor hub relative to the shaft will cause the shaft to move axially relative to the rotors.

10. A motor as claimed in claim 9, wherein spring means are provided for resisting the axial movement of the shaft.

11. A motor as claimed in claim 9, wherein the shaft is axially movable in either axial direction.

References Cited by the Examiner

UNITED STATES PATENTS

| | | | |
|---|---|---|---|
| 2,414,287 | 1/1947 | Crever | 310—68.4 |
| 2,497,141 | 2/1950 | Schultz | 310—68.4 |
| 2,970,249 | 1/1961 | Mazur | 318—97 |

FOREIGN PATENTS 1,216,369  11/1958  France.

MILTON O. HIRSHFIELD, *Primary Examiner.*

ORIS L. RADER, *Examiner.*